March 16, 1954  J. E. JENDRISAK  2,671,987
GLASS BENDING APPARATUS
Filed Sept. 13, 1951  3 Sheets-Sheet 1
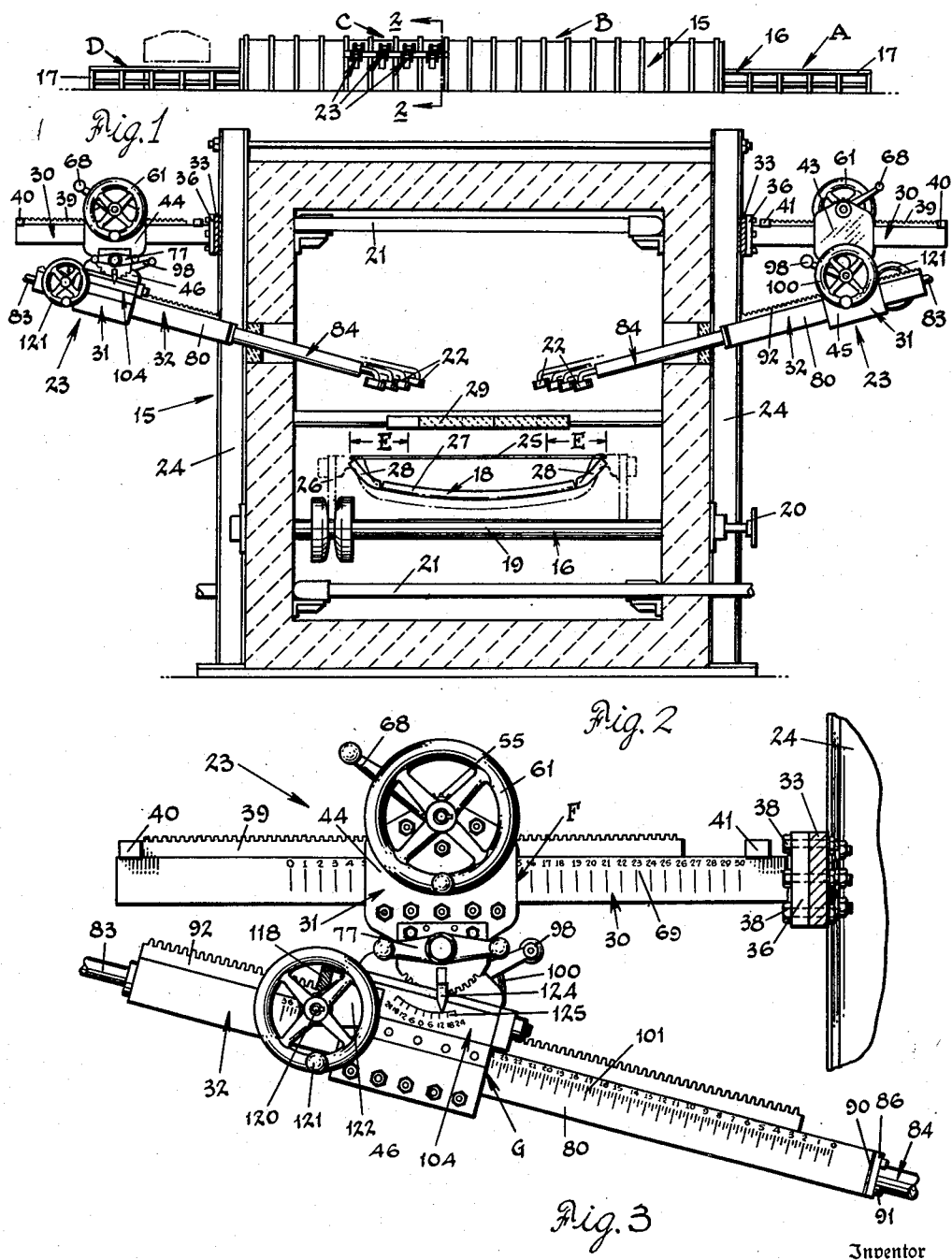
Inventor
Joseph E. Jendrisak
By Nobbe & Swope
Attorneys March 16, 1954 J. E. JENDRISAK 2,671,987
GLASS BENDING APPARATUS
Filed Sept. 13, 1951 3 Sheets-Sheet 2
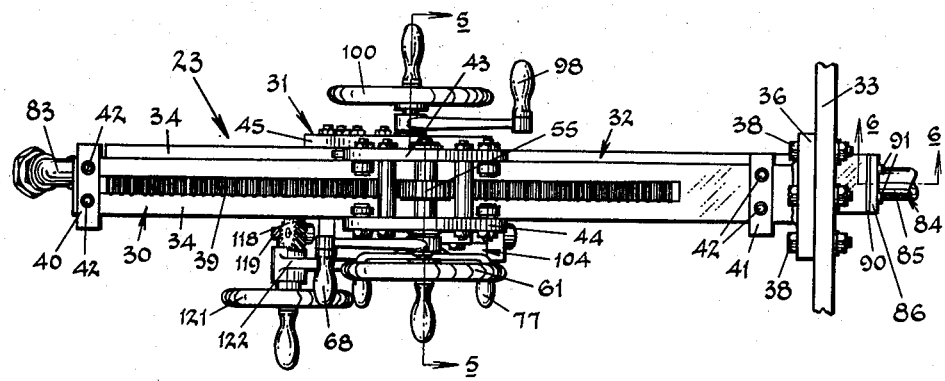
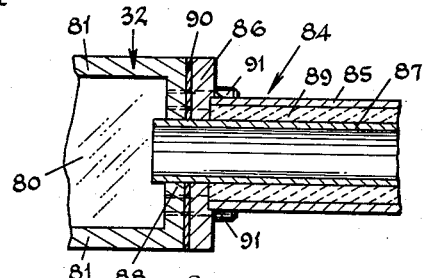
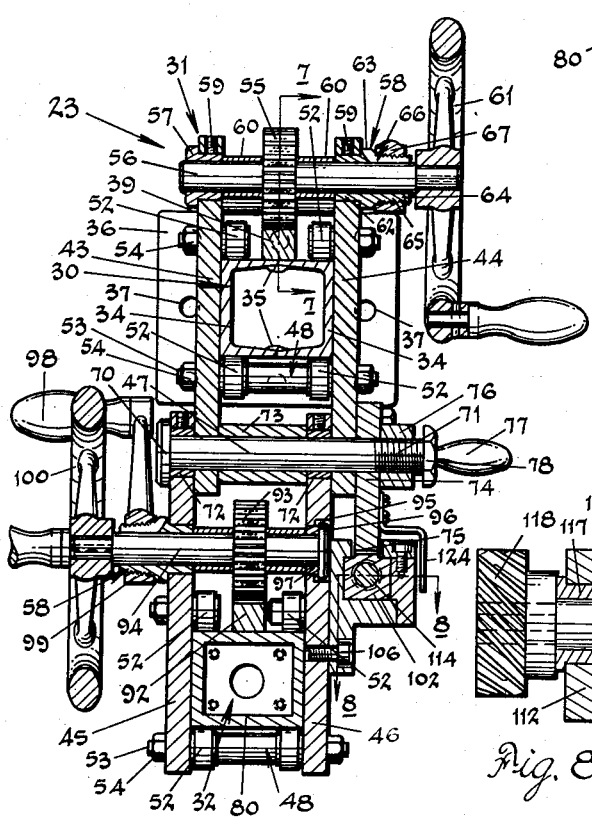
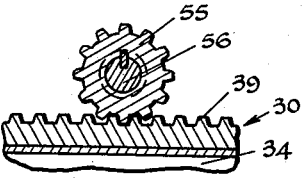
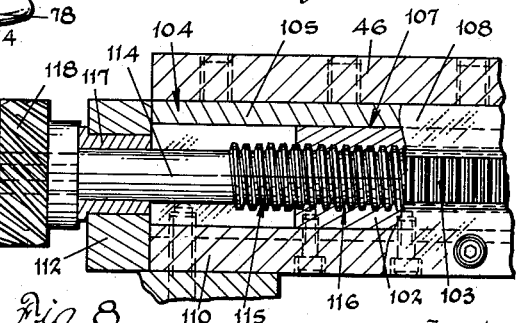
Inventor
Joseph E. Jendrisak
By Nobbe & Swope
Attorneys

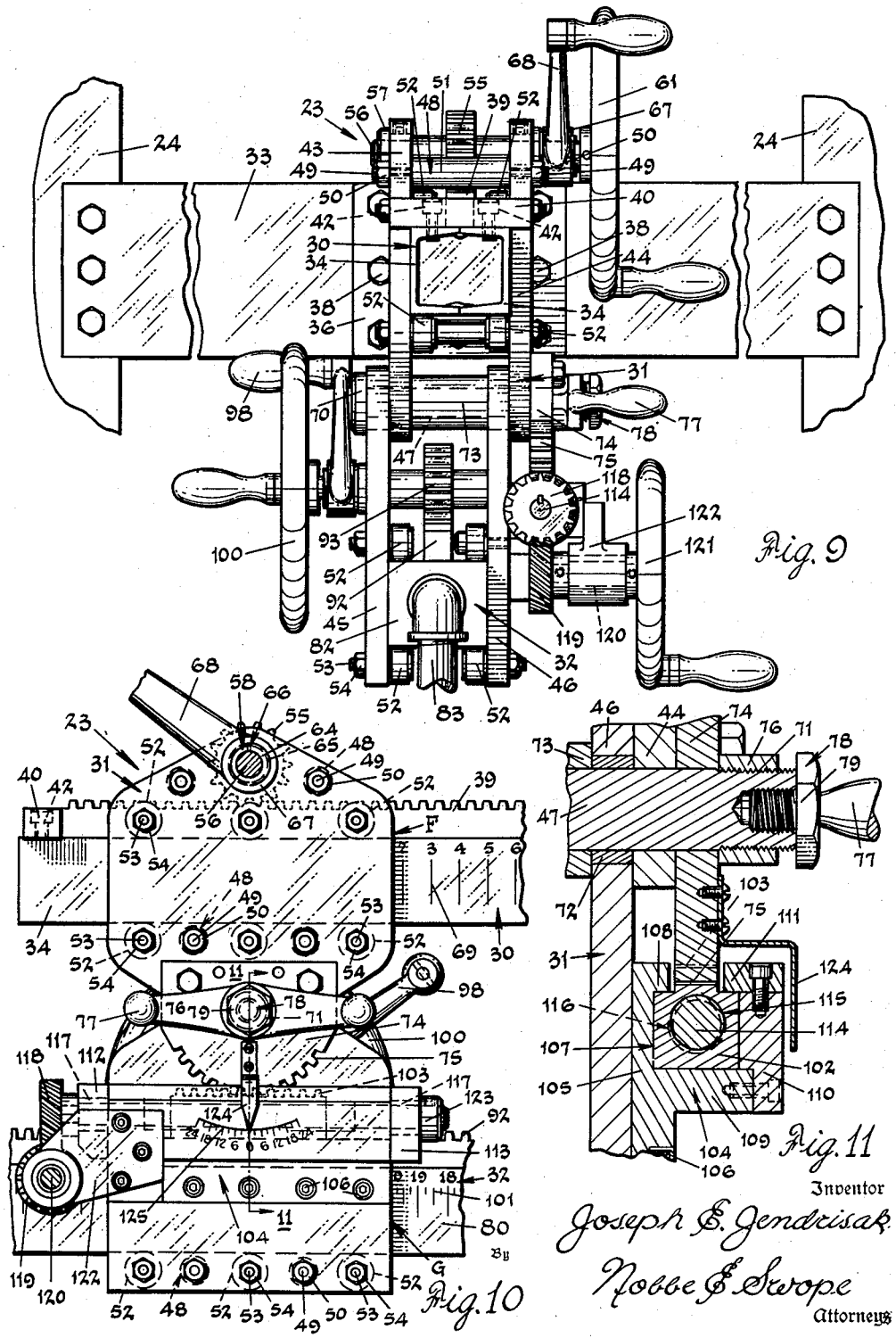

Patented Mar. 16, 1954

2,671,987

UNITED STATES PATENT OFFICE 2,671,987

GLASS BENDING APPARATUS

Joseph E. Jendrisak, Rossford, Ohio, assignor to Libbey-Owens-Ford Glass Company, Toledo, Ohio, a corporation of Ohio Application September 13, 1951, Serial No. 246,480

19 Claims. (Cl. 49—7)

This invention relates broadly to the heating of material treating furnaces. More particularly, it has to do with creation of localized zones of concentrated heat within a furnace and a mounting assembly by means of which the necessary burners can be easily and quickly placed in or returned to predetermined positions from a point remote from the heat zones of the furnace.

Although the apparauts of the present invention is in no wise restricted to any specific manner of heat treatment or furnace construction, it has been found to be particularly well adapted for heating glass sheets in localized areas to obtain satisfactory bends of a complex nature.

Heretofore, the bending of glass has been accomplished by introducing glass sheets on suitable molds into furnace zones of progressively increasing heat and, when the glass is softened, allowing it to freely settle onto the surface of the mold. When the mold surfaces, however, include relatively sharply curved areas, it has been found advantageous to create local zones of concentrated heat, in the general furnace heating zones, which will influence more rapid softening of those portions of the glass sheet that are to settle into registry with such curved areas of the mold. According to prior known methods, such localized zones of heat have been determined by a trial and error placement of special burners which has inevitably resulted in a waste of time and glass until a suitable position of the burners with respect to the areas of the glass to be bent was obtained.

Moreover, these special burners were mounted by various simple methods from ports in the furnace walls and no great emphasis was placed upon their immediate location other than that it was found satisfactory. The usual mounting of such burners has also made it rather difficult to note their location for future reference. When, in a change-over in production runs of glass sheets, it was necessary to alter these locations of the special burners and substitute a different arrangement for the new curvature to be produced, the previously determined positioning of the same was lost.

Now I have found that by employing a mounting assembly of the character herein disclosed, a record can be made of the exact location of a properly positioned special burner, and such records subsequently used to re-locate the burner or burners for the heating of glass in bending to any desired curvature.

A primary aim of this invention therefore is to provide a mounting assembly for furnace burners by means of which such burners can be positioned above defined areas of a glass sheet to be bent and a record obtained of the positions so that, for each and any type of bend curvature to be made, the burners can be easily and quickly returned to their required original positions.

Another object of the invention is to provide a mounting assembly for furnace burners which is constructed so that the burner within a furnace can be moved during normal heating operations to a predetermined location from a point exterior to the furnace and without actual observation of movement of the burner.

Another object of the invention is to provide a novel mounting assembly of several inter-related members, on which a special burner can be attached and which can be moved individually to alter the position of the burner, such individual movements being coordinated one to another so that in total they will bring about easy and rapid movement of the burner.

Another object of the invention is to provide a mounting assembly for a furnace burner that is mountable at a point relatively remote from the furnace heating zones and is constructed of coacting members by which the burner can be caused to move both horizontally and substantially vertically within the heating zones of the furnace without exposure of the operator thereto.

Another object of the invention resides in the provision of a mounting assembly of the above character which comprises a support, a burner unit carrying a burner head and an articulated carriage for mounting the burner unit on the support; the carriage and the burner unit each being individually operable with reference to the base and all of the mentioned members having suitable indicia thereon for establishing a predetermined position of the burner head within a furnace for future reference.

A still further object of the invention is to provide a novel mounting assembly for a furnace burner which is characterized by the rigidity of its component members, ease of operation and the efficiency of its use for the repeated positioning of the head of the burner at a predetermined location.

Other objects and advantages of the invention will become apparent during the course of the following description when read in connection with the accompanying drawings.

In the drawings, wherein like numerals are employed to designate like parts throughout the same:

Fig. 1 is a side elevation of a conventional furnace used for bending glass sheets;

Fig. 2 is an enlarged, transverse section through the furnace shown in Fig. 1, taken substantially along the line 2—2 of that figure;

Fig. 3 is a side elevation of a mounting assembly for furnace burners constructed in accordance with the invention;

Fig. 4 is a top or plan view of the mounting assembly;

Fig. 5 is a transverse, sectional view of the mounting assembly taken on line 5—5 of Fig. 4;

Fig. 6 is a cross-sectional detail view of one end of the burner unit of the mounting assembly;

Fig. 7 is a fragmentary cross-sectional view of a gear driving mechanism taken on line 7—7 of Fig. 5;

Fig. 8 is a horizontal sectional view of another of the gear driving mechanisms taken on line 8—8 of Fig. 5;

Fig. 9 is an end view of the mounting assembly;

Fig. 10 is a partial side elevation of the assembly; and

Fig. 11 is an enlarged, transverse, sectional view taken on line 11—11 of Fig. 10.

Before entering into a detailed description of the mounting assembly of the invention, brief mention of a typical installation and the utility of such a mounting assembly will be made in connection with a conventional furnace employed in the bending of glass sheets as illustrated in Figs. 1 and 2 of the drawings.

While the burner mounting assembly herein disclosed is not restricted to any particular type of furnace, or materials to be treated therein, or to any exact type of special burners used for localized heating purposes, it is especially applicable to glass sheet bending furnaces. The typical bending furnace 15, shown in elevation in Fig. 1, is constructed as a tunnel and equipped with a conventional roller conveyor 16, carried at the entry and exit ends of the furnace on a framework 17. On this conveyor, bending apparatus including molds upon which glass sheets or plates are to be bent, are conveyed progressively from an entry or loading area, indicated at A, through zones of progressively increasing heat B and zones C, wherein the localized heating burners of the invention may be located, to an exit or unloading area D, which may include an annealing leer or suitable equipment for tempering the bent glass sheets by blasts of chilling air.

Referring now to Fig. 2 wherein a cross-section of the furnace of Fig. 1 is disclosed, it will be seen that the bending apparatus or molds 18 are carried by rolls 19 of the conveyor 16 that are rotatably mounted in the side walls of the furnace. One end of each roll projects outwardly from the furnace and is provided with a suitable drive sprocket 20 operated in common with the sprockets of other rolls from a source of power in the usual manner. The furnace 15 has installed therein conventional heating tubes 21 arranged in spaced relation along the bottom and ceiling of the furnace interior. These heating tubes are controlled in any suitable manner to produce successive zones of increasingly higher temperatures which act to gradually raise the temperature of the glass sheets passing therethrough without setting up internal strains and distortion therein.

Ordinarily, simple bends are easily obtained by processing glass sheets through a furnace of the above character, without localized heating and even some bent curvatures including a sharply rising end area or areas can be so produced. However, when such sharply rising areas adjoin central areas of a more shallow curvature and/or extreme end areas of a similar curvature, it has been found that, by reason of the length of glass sheet required to produce such a bend, the bending of the same on a mold becomes rather involved. Thus, typical molds for this purpose are of the hinged variety that are characterized by hingedly movable end sections which can be swung relative to a central mold section. The end sections of a hinged mold are adapted to swing from the closed to the open mold position with reference to the central section so that the mold generally can be distended to approximately the length of the flat glass sheet and will operate to support the same as it softens. However, to bend the sheet into conformity with the sharply curved areas of the hinge mold requires special attention since the mold must be constructed so that the end sections will not close before the glass has become sufficiently plastic to readily assume such a curvature.

To obviate complication of the mold construction and to create a bending procedure that will be universally applicable, recourse has been made to special burners that are carried by pipes inserted through the furnace walls. This manner of placement of the burners has required a great deal of maneuvering, and trial runs of glass, to determine the proper location for the burners, without any substantially permanent structure by which the most effective burner location could be as permanently denoted.

According to the present invention, however, radiant type gas burner heads, such as those indicated at 22 in Fig. 2, are carried by a special mounting assembly, generally designated 23 in its entirety, which is mounted on upright channels or buckstays 24 forming a part of the outer wall construction of the furnace 15. The burners 22 are arranged within the furnace according to the area or areas of the glass sheet 25 that are to be subjected to localized or concentrated heat. Various heat patterns may of course be resorted to but, by way of example, the burner heads 22 are shown as located in transversely aligned pairs, and so that the pattern of the localized heating zone will extend inwardly from an area determined by the extreme end of the glass sheet. Accordingly, the span of this area over the glass may be substantially of a width, as indicated by the letter E, and can be widened or narrowed by changing the arrangement of the burners.

The bending apparatus 18, as herein shown, comprises a rack 26 and mold 27 formed by a central section and end sections that are pivotally connected to the central section by hinges. As illustrated in Fig. 2, the end sections 28 are in the open position of the mold and the sharply curved areas may be seen in the vicinity of ends of the sections 28 adjoining the hinges or the central section of the mold. Since the influencing energy of the radiated heat is to be directed toward the ends of the glass sheet 25, the central areas thereof can, if desired, be protected by shielding devices 29 in a manner well known in the art.

The mounting assemblies 23 for the burner heads 22, which are shown as supported on the upright channels 24, each comprise a base 30, an articulated carriage 31, suspended therefrom and a tubular member 32, herein described as the burner unit, reciprocally supported in the carriage. As will be more fully hereinafter described, the burner unit 32 carries the burner head 22, at its end which projects into the furnace 15. In arranging the burners 22 preliminary to a bending operation, the carriage 31 is moved relative to the base 30 and its position thereon is noted; the burner unit 32 is moved relative to the carriage and its position thereon is noted (in a manner to be hereinafter described) and since both of these motions are substantially in a horizontal plane, the burner 22 will be carried inside of the furnace in a path that is transverse to the movement of the glass sheet therethrough.

If the elevation of the burner 22 above the surface of the glass is now found to be too close or too remote, the carriage 31, due to its articulated construction, can be operated to swing the burner unit 32 through a substantially vertical arc and thereby raise or lower the burner 22 into the proper position of elevation. Once the position of a burner is properly established in relation to the area of the glass to be heated, the positions of the carriage on the base, of the burner unit within the carriage and of the carriage itself can be recorded and when the same curvature is again to be produced, the various elements of the mounting assembly can be quickly and accurately returned to these recorded positions with assurance that the burner will have been restored to the desired position.

Referring now to Figs. 3 to 11 wherein the mounting assembly construction is shown in detail, it will be seen that the assembly 23 is bodily supported on the upright channels or buckstays 24 by a horizontally disposed rail 33 to which the base 30 is attached. More particularly, the base 30 may be formed of a rectangular tube or, as herein shown, may be fabricated from structural channels 34 which are secured together along their abutting edges by welding or like methods, as is indicated at 35. At the inner end of the base 30 there is affixed a plate 36 which is provided with openings 37 for receiving mounting bolts 38 by which the base is firmly attached to the rail 33 carried by the furnace channels 24.

Th rails 33, arranged along and on the opposite sides of the furnace 15, may be provided with registering openings for receiving the bolts 38 in any desired manner of spacing between the burner mounts 23 and the distance to be established between the burners 22 inside the furnace and above the path of the glass on the molds 27.

On the upper surface of the base 30, there is secured a gear rack 39 extending longitudinally between the ends thereof and arranged substantially midway between its sides. The gear rack 39 may be secured by suitable bolts or can be welded to the base. Also carried on the upper surfaces are two stop bars 40 and 41, secured by screws 42, which are adapted to limit movement of the carriage 31 in either direction and particularly to prevent the articulated carriage from inadvertently being dropped from the open or unsupported end of the base.

This carriage 31, as shown in Fig. 5, is comprised of a plurality of plates that are arranged in upper and lower pairs, 43—44 and 45—46 respectively, which are adapted to pivot about a common axis such as on the shaft 47. The upper pair of plates 43—44 are arranged in vertical, slidable relation to the side walls of the base 30 and, to firmly support them in this association, spacer rods 48 are interposed between said plates above and beneath the base. These spacer rods 48 have outer threaded ends 49 of suitably reduced diameter which are extended through the walls of the plates 43 and 44 and receive nuts 50 on the exposed ends thereby drawing the inner surfaces of the plates up against the larger central portion 51 of the spacer rods.

The plates 43 and 44 are supported in their relation to the base 30 and are freely movable therealong by means of rollers 52, having threaded shafts 53 located in the plate walls and secured by nuts 54. As shown in various figures of the drawings, the rollers 52 are arranged above and beneath the base 30 so as to engage the upper and lower surfaces thereof and are substantially transversely aligned in pairs to equalize the weight of the carriage. The carriage 31 is caused to move along the base 30 by means of a gear 55 carried in meshing relation with the gear rack 39 and manually operated to cause its rotation therealong.

For this purpose, as shown in Fig. 7, the gear 55 is mounted on and keyed to a shaft 56 carried in the plates 43 and 44 by means of journals 57 and 58. If desired, the journals or sleeve bearings may be secured by set-screws 59. Also, spacer sleeves 60 may be located on the shaft 56 between the gear 55 and the adjacent and inner ends of the sleeve bearings. At one end of the shaft 56, there is provided a hand-wheel 61 by which the gear 55 may be manually turned to propel the carriage 31 along the base 30 by meshing engagement with the teeth of the gear rack 39 thereon.

To lock or clamp the shaft 56 from rotation and to thereby hold the carriage at any desired position on the base 30, the sleeve bearing 58 is of a special formation which includes a bearing portion 62 mounted in the wall of the plate 44, an annular flange 63 and an outwardly directed hub 64 having a "lock-nut" thread 65 formed thereon. As shown in Figs. 5 and 10, this threaded hub 64 is slotted, as at 66. The "lock-nut" thread 65, in the nature of a taper similar to a conventional pipe thread, receives the end 67 of a lever 68, said end being correspondingly internally threaded.

Consequently when the lever 68 is turned to advance the threaded end inwardly on the hub 64, the progressively increasing taper of the mating threads will serve to compress the slot 66 and thereby clamp the adjoining internal area of the bearing 58 tightly around the shaft 56. Since this clamping action will result upon very slight compression of the slot, the actual "throw" of the lever 68 will be quite short. Thus by gripping the lever 68 and the hand-wheel 61, a short turning motion of the lever to turn the end 67 thereof and move it outwardly will release the shaft 56 whereupon it may be turned to move the carriage 31 along the base 30 and as the gear 55 advances, in either direction, in meshing relation with the gear rack 39.

In order that the extent of movement of the carriage 31 and the burner unit 32 mounted within the carriage, along the base 30 may be accurately determined or, having moved the same to a desired position it can be noted, one side wall of the base 30 is provided with a scale, as indicated at 69 in Figs. 3 and 10. Movement of the carriage 31 may be considered as the primary movement of the burner unit and horizontal extension of the burner head 22 thereof into and out of a predetermined area within the furnace 15. Preferably, the carriage 31 is initially located on the base 30 by moving the same until the proximate edges of the plates 43 and 44 will engage the end stop-bar 40 in which position the opposite edges, indicated by the letter F, of said plates will substantially register with the "0" point of the scale 69.

Then, when the lever 68 is turned to release the clamping relation between the shaft 56 and the hub 64 of sleeve 58, the hand-wheel 61 can be operated to rotate the gear 55 to move the same along the gear rack 39 and consequently carry the carriage 31 so that the designated edges F of the plates 43—44 will progressively move past the increasing numerical values of the scale 69 as the component parts of the mounting assembly 23 are carried toward the furnace 15.

As noted above, the upper pair of plates 43—44 and the lower pair of plates 45—46 are pivotally interconnected by the shaft 47. More particularly, and as clearly shown in Fig. 5, the shaft 47 is provided at one end with an enlarged head 70 and at its opposite end with a threaded portion 71. Between these ends of the shaft, it is journaled in bearings 72 mounted in the upper end of the lower pair of plates 45—46 and, adjacent the bearings, the shaft is supported in suitable openings in the lower ends of the upper pair of plates 43 and 44. A spacer sleeve 73 is carried by the shaft 47 and the ends thereof loosely abut the upper plate 43 and the lower plate 46, these being the inner plate of each pair.

Mounted on the outer surface of the upper plate 44, is a plate 74 through which the threaded end 71 of the shaft 47 extends. The lower surface of the plate 74 is formed to provide a gear sector 75 which will be more fully hereinafter described. On the threaded end 71 of the shaft 45, there is received the internally threaded hub 76 of a lever 77. To prevent the lever from being inadvertently removed from the threaded end 70, the shaft 47 is axially tapped to receive a threaded stop member 78 having an enlarged head 79.

The lever 77 operates when advanced inwardly on the threads 71 to engage the plate 74 and produce an endwise thrust on the plates 43—44 and 45—46 as they are forced together between the head 70 of the shaft 47, the spacer sleeve 73 and the hub 76 of the lever. This action is intended to secure the plates in a fixed relation and, more especially, to clamp the lower pair of plates 45—46 from pivotal motion about the axis of the shaft 47 and relative to the upper pair of plates 43—44. Accordingly unless an angular relation is to be created between the pairs of plates 43—44 and 45—46, they can be considered as fixed component parts of the articulated carriage 31.

The burner unit 32, hereinbefore broadly described as being supported by the carriage 31, in the main comprises a substantially square, elongated tubular body or chamber 80, the side walls 81 of which are received between the lower pair of plates 45—46. The tubular chamber is provided at one, or the rear, end wall 82 with a suitable pipe-tapped opening for receiving a pipe 83 by which the chamber is connected to a conventional gas supply line (Fig. 3). At the opposite end of the chamber, provision is made for securing an insulated pipe assemblage 84 which extends into the furnace and is adapted to carry the burner head 22 at its end. While the tubular body does not constitute a specially constructed mixing chamber for the gas supply to the burner head, it has been found more convenient to replace the insulated assemblage, extending into the furnace, or make the necessary connections to the gas supply lines by using a tubular body of this character while, at the same time, employing the same for its intended purpose of reciprocal movement within the carriage 31.

The burner head, which is conventionally shown in Fig. 2, is of the radiant gas heater type and the heat developed therefrom is directed in the form of radiant energy toward the glass. By reason of this radiant characteristic, the burner head will produce a zone of concentrated heat energy which can be employed to influence the softening of desired localized areas of the surface. Thus those areas of a glass sheet that are to be made more plastic than adjoining areas may be subjected to the effects of a series of such burners so as to more readily bend into contact with the mold surfaces.

This insulated assemblage 84 (Fig. 6) comprises an outer metal jacket 85 equipped with a mounting plate 86, an inner pipe 87 communicating with the chamber 80 through the end wall 88 thereof and an insulating wall 89 therebetween, the wall being formed of any suitable heat insulating material. In mounting the assemblage 84 on the chamber 80, a gasket 90 is placed on the end wall 88 of the chamber and the plate 86 is secured tightly thereagainst by bolts 91 or the like.

The body or chamber 80 of the burner unit 32 is supported by the carriage 31 in substantially the same manner that the carriage is supported on the base 30 and likewise similar provision is made for moving the unit 32 relative to the carriage. That is to say, the inner surfaces of the plates 45 and 46 are equipped with similar rollers 52 that are arranged to make rolling contact with the upper and lower surfaces of the chamber 80. If desired, the parallel spacing between the plates 45 and 46 and the spacing with reference to the side walls of the chamber 80 can be maintained at the upper and lower ends of said plates by means of the spacer rods 48 located between the plates at their lower ends as shown in Fig. 5. Since the spacing between the plates of each pair is to be substantially the same, the central portions 51 of the spacer rods 48 will have a length equal to the combined length of the spacer sleeve 73 and the thickness of the plate 43 on the shaft 47. Thus by arranging the spacer rods 48 between the plates 43 and 44 above and below the base 30 and between the plates 45 and 46 beneath the tubular chamber 80 of the burner unit 31, the desired parallel relation of the pairs of plates will be effectively maintained.

Affixed to the upper surface of the tubular chamber 80, there is also secured a gear rack 92 similar to gear rack 39 on the base 30. Above the rack and in meshing relation therewith is a gear 93 carried on a shaft 94. While the shaft 94 is generally supported in the walls of the plates 45—46 as is the shaft 56 in the walls of the plates 43—44, previously described, the construction of this shaft differentiates it from the shaft 56 by reason of its mounting.

As shown in Fig. 5, one end of the shaft 94 is provided with a head 95 that is received in the counter-bore 96 of an opening made in the plate 46 for mounting of the shaft journal 97. In the opposite plate 45, the shaft 94 is journaled in a bearing 58 so that it, like the shaft 56, can be releasably secured from rotation. The shaft 94 is clamped in the special journal by operation of a lever 98 having an internally threaded hub 99 received on the "lock-nut" thread 65 of the journal hub 64 of bearing 58. On the outer end of the shaft, a hand-wheel 100 is fixedly mounted to provide for turning the same.

Movement of the burner unit 32 relative to the carriage is indicated by means of scales 101 that may be located on one or both of the side walls 81 of the tubular chamber 80. As shown in Figs. 3 and 10, these scales are arranged in reverse order from the scale 69 on the base 30 since the unit 32 moves with reference to the carriage 31 while the carriage moves with respect to the base. The scales 101 are also of a more defining nature and may be represented by inches and suitable fractions thereof. By means of the scales 101, the second adjustment of the mounting device 23 may be accomplished and when the primary position is indicated by the position of the plate 44 on the scale 69, a finer calibration of position can be obtained by moving the burner unit until the one edge G of the plate 46 registers with the desired numerical value.

Now, when the burner head 22 is to be further positioned, or, more particularly, when the burner head 22 is to be raised or lowered with reference to the surface of a glass sheet or a substantially horizontal plane through which it passes, the burner unit, by the carriage 31, is adapted to be swung through a substantially vertical arc. To do this, the lever 77 is operated to remove the clamped association effected between the pairs of plates 43—44 and 45—46 so that the lower pair of plates 45—46 can be swung on the shaft 47 and relative to the upper pair of plates 43—44. For this purpose, the plate 46 has mounted thereon a gear rack 102 having teeth 103 on the upper surface thereof which mesh with the gear sector 75 of the plate 74, carried by the upper plate 44. The gear rack 102 is slidably supported in a slide-block 104 secured to the lower plate 46.

This slide-block is formed by a plate 105 mounted by screws 106 on the plate 46. The plate 105, as shown in Fig. 11, has a guide-way 107 formed in part by an upper ledge 108 and a bottom ledge 109 on said plate. The gear rack 102 is slidably mounted within the slide-block 104 by means of an additional plate 110 that is secured to the bottom ledge 109 and a gib-plate 111 secured on the upper surface of the plate 110. The slide block 104 is closed at its ends by end caps 112 and 113.

The gear rack 102 is caused to move within the guideway 107 by means of a shaft 114 having a threaded central portion 115 in the nature of a worm or Acme thread. As shown in Fig. 8, the rack 102 is similarly internally threaded, as at 116, to receive the threaded portion 115 of shaft 114. At its opposite ends, the shaft is mounted in journals 117 in the end caps 112 and 113. The shaft 114 carries at one outer end a spiral gear 118 which is in meshed relation with a second spiral gear 119 on a shaft 120. The shaft 120 carries a hand-wheel 121 and is journaled, intermediate the gear 119 and said hand-wheel, in a bracket 122 suitably secured to the plate 110 of slide block 104. Upon turning the gears 118 and 119, the threaded portion 115 of the shaft 114 will cause the threads 116 of gear rack 102 to move the same within the guideway 107 and, in meshing with the gear sector 75, produce pivotal motion of the plates 45 and 46.

In order that the shaft 114 may be restrained from endwise movement with respect to the gear rack whereby corresponding reciprocal movements of the rack within the slide block will be produced, the hub of the spiral gear 118 abuts the adjacent journal 117 at one end of the shaft while a collar 123, secured to the opposite end of the shaft, is positioned relative to the adjacent journal 117 in the end cap 113. Rotation of the shaft 114 will cause the threaded portion 115 thereof to advance with respect to the internal threads 116 of the gear rack 102 and operate to cause the movement thereof within the guide way 107. This movement is imparted through the gear teeth 103 of the rack 102 to the gear sector 75 in such a fashion that the lower pair of plates 45 and 46 of carriage 31 and the burner unit 32 carried therebetween will be caused to swing relative to the base 30 and the upper pair of plates 43 and 44 of the carriage mounted thereon. The extent of angular motion effected between the related pairs of plates can be determined by means of a pointer 124 carried on the plate 74 which pointer will indicate the radial motion as the scale 125, in the form of a protractor, on the plate 110 of the slide block 104 is moved radially past the same.

In the general use of the mounting assembly in a bending furnace or kiln as disclosed in Fig. 2, it has been found that the burners 22 can be located in an original set-up for heating of glass sheets during their bending to a special curvature by moving the burners in and out and up and down above a sheet carried in the customary manner on a hinged bending mold in its open mold position. Upon movement of the carriage 31 along the base 30 or movement of the burner unit 32 relative to the carriage, the generally desired position of the burners can be obtained in a line transverse to the movement of the mold through the furnace. In adjusting the position of the burner 22 with reference to its elevation above the glass sheet, it may become necessary to not only swing the burner unit 32 upwardly or downwardly by means of gear sector 75 and rack 102 but to reciprocate the unit 32 within the carriage until the desired positional elevation is reached. Now if the positions of the carriage on the base, the burner unit on the carriage and the pair of plates 45—46 relative to the upper pair of plates 43—44 are checked on the respective scales 69, 101 and 125, the position of the burner 22 inside the furnace can be exactly determined and a permanent record made of the same. By way of example, by referring to Fig. 3, it will be seen that from a known point of reference within the furnace, such as the inner surface of the wall adjacent the mounting assembly, the carriage 31 has been moved inwardly to the legend 15 while the burner unit has been moved inwardly with respect to the carriage substantially to the legend 24 so that the burner head 22 will have been transversely moved horizontally within the furnace a total of thirty-nine units or inches. Also as therein shown, the relation of the plates 45—46 to the plates 43—44 of carriage 31 is such that the burner unit 32 and the burner 22 are inclined at an angle of 15°. By recording these various factors, such as 15″, 24″ and 15°, for one position of the burner and repeating the procedure throughout the series of burners 22, the desired locations of the same for one particular bend curvature can be permanently established. Should it become necessary to produce a second type of curvature and the burners are moved into new positions, a subsequent return, even during the maintenance of high temperatures within the furnace, of the said burners to the first positions can be readily made by movement of the component parts of the mounting assemblies 23.

In carrying out these adjustments, the lever 68 is swung to allow the slot 66 in the special journal 58 to expand and thereby releases the shaft 56 for rotation. Turning of the hand-wheel 61 now causes the gear 55 to traverse the gear rack 39 on the base 30 until the desired legend on the scale 69 is reached. Upon reversing motion of the lever 68, the shaft 56 will again be secured from motion in journal 58. The lever 98 is now swung to release the shaft 94 whereupon it can be turned by the hand-wheel 100 to advance the gear 93 along the gear rack 92, actually this operation causes the said rack to move thereby reciprocally moving the burner unit 32 within the carriage until the second position is denoted on the scale 101. The shaft 94, similarly to the shaft 56, will be secured from rotation by reversal of the lever 98. To bring about angular motion of the burner unit, the lever 77 is swung to remove the clamped condition effected between the head 70 of the shaft 47, the plates 43—44 and 45—46, the spacer sleeve 73 and the hub 76 of the lever. It is now possible to turn the hand-wheel 121, and, through the meshed spiral gears 118 and 119, rotate the shaft 114 and cause the gear rack 102 to move relative to the gear sector 75 and thereby swing the burner unit 31 to a predetermined position of angularity as indicated by the pointer 124 relative to the scale 125. The actual movement of the burners 22 within the furnace during these adjustments thus need not be actually observed but the exact positions to which they are moved will be accurately obtained or indicated on the respective scales of the mounting assembly.

By employing mounting assemblies, as hereinbefore described in detail, it is now possible to achieve the heating of glass sheets, prior to their bending, in selected areas and with a definite positioning of localized heating burners above the selected areas. Furthermore, movements of the component parts of each assembly can be effected without loss of furnace heat—i. e., lowering of the same during a change-over in bend curvatures—and without exposure of the operators to radiating heat from opened ports of the furnace. More especially, in the production of a series of special curvatures to which glass sheets may be bent, the respective positions of the burners for each of the curvatures can be easily ascertained and they can be subsequently returned to such positions in an expedient manner.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for bending glass sheets or plates, in combination, a furnace having means for heating said sheets to bending temperature, conveyor means within said furnace, a bending mold carried through the furnace upon said conveyor means and supporting a flat sheet of glass to be bent, and a series of burners arranged longitudinally adjacent each side of the furnace and disposed above the path of travel of the glass sheet, each series of burners extending diagonally of the path of travel of the glass sheet to effect the localized heating of selected portions of said sheet.

2. In apparatus for bending glass sheets or plates, in combination, a furnace having means for heating said sheets to bending temperature, conveyor means within said furnace, a bending mold carried through the furnace upon said conveyor means and supporting a flat sheet of glass to be bent, a series of burners arranged longitudinally adjacent each side of the furnace and disposed above the path of travel of the glass sheet, and means for independently moving said burners relative to one another transversely of the path of travel of said sheet to effect the localized heating of selected portions of each sheet.

3. In apparatus for bending glass sheets or plates, in combination, a furnace having means for heating said sheets to bending temperature, conveyor means within said furnace, a bending mold carried through the furnace upon said conveyor means and supporting a flat sheet of glass to be bent, a series of burners arranged longitudinally adjacent each side of the furnace and disposed above the path of travel of the glass sheet, and means for independently moving said burners relative to one another transversely of and normal to the path of travel of said sheet to effect the localized heating of selected portions of each sheet.

4. In apparatus for bending glass sheets or plates, in combination, a furnace having means for heating said sheets to bending temperature, conveyor means within said furnace, a bending mold carried through the furnace upon said conveyor means and supporting a flat sheet of glass to be bent, a series of burners arranged longitudinally adjacent each side of the furnace and disposed above the path of travel of the glass sheet, means for independently moving said burners relative to one another transversely of the path of travel of said sheet to effect the localized heating of selected portions of said sheet, and means for indicating a predetermined position for each burner in relation to said selected portions of the sheet.

5. In apparatus for bending glass sheets or plates, a tunnel type furnace, conveyor means for carrying molds upon which glass sheets are adapted to be supported and bent through the furnace, means for heating said sheets to bending temperature a burner within said furnace for applying localized heat to selected portions of the glass sheets on said molds, and means mounted outside of said furnace for supporting said burner for movement relative to the molds on said conveyor.

6. In apparatus for bending glass sheets or plates, a tunnel type furnace, conveyor means for carrying molds upon which glass sheets are adapted to be supported and bent through the furnace, means for heating said sheets to bending temperature a burner within said furnace for applying localized heat to selected portions of the glass sheets on said molds, and means mounted outside of said furnace for supporting said burner for movement in two planes relative to the molds on said conveyor.

7. In apparatus for bending glass sheets or plates, a tunnel type furnace, conveyor means for carrying molds upon which glass sheets are adapted to be supported and bent through the furnace, means for heating said sheets to bending temperature a burner within said furnace for applying localized heat to selected portions of the glass sheets on said molds, means mounted outside of said furnace for supporting said burner for movement relative to the molds on said conveyor and means on said supporting means for indicating the position of said burner with relation to the molds on said conveyor.

8. In apparatus for bending glass sheets or plates including a furnace within which the sheets are to be bent, a burner assembly comprising a base extending outwardly from said furnace, a tubular member extending inwardly of the furnace, a carriage for supporting the tubular member on said base and means on said carriage for adjusting the angular position of said tubular member relative to the base.

9. In apparatus for bending glass sheets or plates including a furnace within which the sheets are to be bent, a burner assembly comprising a base extending outwardly from a wall of said furnace, a carriage outside of said furnace having a portion mounted for movement along said base and a second portion pivoted to said first portion, an elongated burner unit mounted for reciprocal movement within said second mentioned carriage portion and extending into said furnace, and a burner carried at the end of said burner unit lying within said furnace.

10. In apparatus for bending glass sheets or plates including a furnace within which the sheets are to be bent, a burner assembly comprising a base extending outwardly from a wall of said furnace, a carriage outside of said furnace having a portion mounted for movement along said base and a second portion pivoted to said first portion, an elongated burner unit mounted for reciprocal movement within said second mentioned carriage portion and extending into said furnace, a burner carried at the end of the burner unit lying within said furnace and indicating means on the burner assembly for indicating the position of the burner head.

11. In apparatus for bending glass sheets or plates including a furnace within which the sheets are to be bent, a burner assembly comprising a base extending outwardly from a wall of said furnace, a carriage outside of said furnace having a portion mounted for movement along the base and a second portion pivotally connected to the first portion, a burner unit including a burner head normally disposed within the furnace, the burner unit being mounted for reciprocal movement within said second portion of the carriage, means for initially moving the burner unit relative to the base by movement of the first portion of said carriage to a predetermined position on the base, means mounting the burner unit on the carriage for movement relative thereto to a second predetermined position, means for pivotally mounting the said second portion of the carriage relative to the first portion of the carriage to permit the burner unit to be swung to a third predetermined position, and indicating means on the burner assembly for indicating such first, second and third positions of the burner unit to thereby repetitively locate the burner head thereof in a predetermined position for heating the glass during bending to one special curvature.

12. In apparatus for bending glass sheets or plates including a furnace within which the sheets are to be bent, a mounting assembly for furnace burners comprising a substantially horizontally disposed base for supporting said assembly bodily on the wall of the furnace, a burner unit mounted for movement relative to said base and carrying the burner head within the furnace, a carriage for supporting the burner unit for movement along the base, means mounting the burner unit on said carriage for movement relative thereto and means on said carriage for mounting the burner unit for swinging movement in a vertical plane to adjust the position of the burner head of said burner unit within the furnace.

13. In apparatus for bending glass sheets or plates including a furnace within which the sheets are to be bent, a mounting assembly for furnace burners comprising a substantially horizontally disposed base for supporting said assembly bodily on the wall of the furnace, a burner unit mounted for movement relative to the base and carrying a burner head within the furnace, a carriage formed of pivotally related parts and mounted on the base for reciprocal movement therealong, means indicating the position of the carriage relative to the base, means mounting the burner unit for reciprocal movement in one of the pivotally related parts of said carriage, driving means for moving said burner unit reciprocally within the carriage, means indicating the position of the burner unit relative to the carriage, and means on said carriage indicating the angular position of the burner unit to determine the position of the burner head thereof within the furnace.

14. In apparatus for bending glass sheets or plates including a furnace within which the sheets are to be bent, a mounting assembly for furnace burners comprising a substantially horizontally disposed base for supporting the same bodily on the outer wall of a furnace, a carriage formed of pivotally related parts and supported by one of said parts on the base, means for swinging the lower carriage part relative to the upper part thereof, means for moving the upper carriage part along the said base, a burner unit having a burner head disposed within the furnace and mounted for reciprocal movement in the said lower part of the carriage, means for locking the said upper part of the carriage from movement relative to the base, means for locking the lower part of the carriage from swinging movement relative to the upper part of the carriage, means for locking the burner unit from reciprocal movement relative to the lower part of the carriage, and means on the mounting assembly for determining the position of the burner head of said unit when the component parts of said mounting assembly are in their locked position.

15. In apparatus for bending glass sheets or plates including a furnace within which the sheets are to be bent, a mounting assembly for furnace burners comprising a horizontally disposed stationary base for supporting said assembly on the outer wall of the furnace, a burner unit having a burner head normally disposed within the furnace, a carriage formed of pivotally related parts arranged in pairs above and below a common pivotal axis, means for supporting the upper pair of carriage plates for movement along the stationary base, means for moving the upper pair of carriage plates along the base, the lower part of carriage plates being adapted to support the burner unit, means for mounting said burner unit for reciprocal movement within the lower pair of carriage plates, means for creating relative pivotal movement between said upper and lower pairs of carriage plates, and indicating means on said mounting assembly for determining the position of the burner head within the furnace by the relative positions of the carriage to the base and the burner unit to the carriage and the upper and lower pairs of plates of said carriage to each other.

16. A mounting assembly for furnace burners comprising a horizontally disposed base for supporting the same bodily on the outer wall of a furnace, a tubular body adapted to carry a burner head at one end thereof, a carriage formed of a plurality of pivotally related plates arranged in pairs above and below a common pivotal axis, a shaft journaled in said plates and pivotally connecting said upper and lower pairs thereof, means for mounting the upper pair of carriage plates for movement along the base, a gear rack longitudinally arranged on said base, a gear rotatably carried by the upper pair of carriage plates and adapted to move the carriage along the base when turned in meshed relation with said gear rack, means for securing the gear from rotation, means for mounting the tubular body for reciprocal movement within the lower pair of carriage plates, a gear rack longitudinally arranged on the said tubular body, a gear rotatably carried by the lower pair of carriage plates and adapted to reciprocally move the said tubular body relative to the carriage when turned in meshed relation with the gear rack thereon, means for securing the second gear from rotation, and means for pivotally moving the lower pair of carriage plates relative to the upper pair of said plates to produce angular motion of the tubular body in a vertical plane.

17. In apparatus for bending glass sheets or plates including a furnace within which the sheets are to be bent, a mounting assembly for furnace burners comprising a base secured to and extending outwardly from a wall of the furnace, a gear rack affixed to the upper surface of the base, a carriage formed of a plurality of pivotally related plates arranged in pairs above and below a common pivotal axis, a shaft connecting the said upper and lower pairs of carriage plates, the upper pair of carriage plates being disposed along opposed side walls of the base, rollers rotatably carried by the said upper pair of plates and arranged in rolling contact with the upper and lower surfaces of the base to movably support the carriage thereon, journals located in said upper pair of plates, a shaft mounted in the journals, means for turning the shaft, one of the journals having an axially aligned slot formed therein, means for compressing the slot in said journal to secure the shaft from rotation, a gear keyed to the shaft and meshing with the gear rack on the base to move the carriage therealong upon turning of said shaft, indicating means on said base to determine the position of the carriage thereon, a burner unit extending into said furnace and carrying a burner head at the end thereof, rollers rotatably carried by the lower pair of carriage plates and arranged in rolling contact with the upper and lower surfaces of the burner unit to reciprocally support said unit within the carriage, a gear rack affixed to the upper surface of the burner unit journals mounted in the lower pair of carriage plates, a shaft mounted in the journals, means for turning the shaft, one of the journals having an axially aligned slot formed therein, means for compressing the slot in said journal to secure the shaft from rotation, a gear keyed to the shaft and meshing with the gear rack on the burner unit to move said unit relative to the carriage upon turning of said shaft, indicating means on the burner unit to determine its position relative to the carriage, means for pivotally moving the lower pair of carriage plates relative to the upper pair for moving the burner unit angularly in a vertical plane, and indicating means on said lower pair of carriage plates for determining the extent of such angular movement.

18. A mounting assembly for furnace burners comprising a horizontally disposed base for supporting said assembly on the wall of a furnace adapted to heat glass sheets and bend the same to a special curvature, a burner unit extending into the furnace and carrying a burner head at the end thereof, a carriage supporting the burner unit on said base and formed of pivotally related plates arranged in pairs above and below a common pivotal axis, a shaft journaled in the adjoining ends of the upper and lower pairs of carriage plates, a spacer sleeve mounted on the shaft and between the innermost plates of each of said pairs, means acting to clamp said pairs of plates against said spacer sleeve to lock the same from movement, a gear sector attached to one of the upper pair of carriage plates, an internally threaded gear rack mounted for reciprocal movement on an adjacent plate of the said lower pair and in meshing engagement with the gear sector, a threaded shaft received in the gear rack, means for preventing endwise motion of the threaded shaft, means for rotating said threaded shaft to produce endwise movement of the gear rack and swinging movement of the lower pair of carriage plates relative to the upper pair, indicating means on the said lower pair of plates, a pointer carried on the upper pair of plates and registering with the indicating means to determine the angular position of the lower pair of plates to the upper pair, and indicating means on said base and said burner unit to exteriorly determine the position of the burner head inside of the furnace.

19. A mounting assembly for furnace burners comprising a horizontally disposed base for supporting said assembly on the wall of a furnace adapted to heat glass sheets and bend the same to a special curvature, a tubular body extending toward the furnace and adapted to carry a burner head at the end thereof, a gear rack affixed to the upper surface of the base, a carriage formed of pivotally related plates arranged above and below a common pivotal axis, a shaft for pivotally connecting the said upper and lower pairs of carriage plates, the upper pair of carriage plates being disposed along opposed sides of the base, rollers rotatably carried by said upper pair of plates and arranged in rolling contact with the upper and lower surfaces of the base to movably support the carriage thereon, journals located in said upper pair of plates, a shaft mounted in the journals, means for turning the second shaft, one of the journals having an axially aligned slot formed therein, means for compressing the slot in said journal to secure the shaft from rotation, a gear keyed to the shaft and meshing with the gear rack on the base to move the carriage therealong upon turning of the said second shaft, indicating means on said base to determine the position of the carriage thereon, rollers rotatably carried by the lower pair of carriage plates and arranged in rolling contact with the upper and lower surfaces of the said tubular body to reciprocally support said body within the carriage, a gear rack affixed to the upper surface of the tubular body, journals mounted on the lower pair of carriage plates, a shaft mounted in the journals, means for turning the third shaft, one of the journals having an axially aligned slot formed therein, means for compressing the slot to secure the shaft from rotation, a gear keyed to the shaft and meshing with the gear rack on the tubular body to move the same relative to the carriage upon turning of said third shaft, indicating means on said tubular body to determine its position relative to the carriage; a spacer sleeve mounted on the first mentioned shaft between the innermost plates of the said upper and lower pairs of carriage plates, means acting to clamp said pairs of plates against the spacer sleeve to lock the same from movement, a gear sector attached to one plate of the said upper pair, an internally threaded gear rack mounted for reciprocal movement on an adjacent plate of the said lower pair and in meshing engagement with the gear sector, a threaded shaft received in the gear rack, means for preventing endwise movement of the threaded shaft, means for rotating said threaded shaft to produce endwise movement of the gear rack and swinging movement of the lower pair of carriage plates relative to the upper pair, indicating means on the said lower pair of plates and a pointer on the said upper pair of plates registering with the indicating means whereby the burner head of said tubular body may be repeatedly positioned at a predetermined location above an area of a glass sheet to be heated and then bent to a special curvature.

JOSEPH E. JENDRISAK.

References Cited in the file of this patent

UNITED STATES PATENTS

| Number | Name | Date |
|---|---|---|
| 1,188,951 | Lacerda | June 27, 1916 |
| 2,125,176 | Jones | July 26, 1938 |
| 2,423,188 | Herbst | July 1, 1947 |
| 2,450,297 | Pearse et al. | Sept. 28, 1948 |
| 2,452,488 | Paddock et al. | Oct. 26, 1948 |
| 2,460,826 | Hooser | Feb. 8, 1949 |